US010583382B2

(12) United States Patent
Howe et al.

(10) Patent No.: US 10,583,382 B2
(45) Date of Patent: Mar. 10, 2020

(54) EFFLUENT PROCESSING APPARATUS FOR A VEHICLE AIR BRAKE CHARGING SYSTEM

(71) Applicant: Bendix Commercial Vehicle Systems LLC, Elyria, OH (US)

(72) Inventors: Stephen Howe, Cuyahoga Falls, OH (US); David W Perry, North Ridgeville, OH (US); Gregory R Ashley, Amherst, OH (US); Fred W Hoffman, Wakerman, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 125 days.

(21) Appl. No.: 15/724,655

(22) Filed: Oct. 4, 2017

(65) Prior Publication Data

US 2019/0099705 A1    Apr. 4, 2019

(51) Int. Cl.
*B01D 45/12* (2006.01)
*B04C 3/00* (2006.01)
(Continued)

(52) U.S. Cl.
CPC ............. *B01D 45/16* (2013.01); *B01D 17/02* (2013.01); *B01D 45/18* (2013.01); *B01D 53/26* (2013.01);
(Continued)

(58) Field of Classification Search
CPC ........ B01D 45/12; B01D 5/081; B01D 45/16; B01D 45/18; B01D 17/02; B01D 2258/06;
(Continued)

(56) References Cited

U.S. PATENT DOCUMENTS 3,200,568 A    8/1965  McNeil
3,339,350 A    5/1967  Sims
(Continued)

FOREIGN PATENT DOCUMENTS

DE    102006002975 B4    1/2008
EP         2471588 B1    11/2014
(Continued)

OTHER PUBLICATIONS

Bendix Commercial Vehicle Systems, "SD-08-187 Bendix PuraGuard System Filter," Service Data Sheet, Jul. 2004, 8 pages, Bendix Commercial Vehicle Systems LLC, Elyria Ohio, U.S.A.
(Continued)

*Primary Examiner* — Minh Chau T Pham
(74) *Attorney, Agent, or Firm* — Cheryl Greenly; Brian Kondas; Eugene Clair

(57) ABSTRACT

An effluent processing apparatus is provided for a vehicle air brake charging system. The effluent processing apparatus has an inlet port through which effluent from a purge valve of an air dryer can be received and an outlet port. The effluent processing apparatus further has a quadric surface defining an effluent flow chamber that is connected in fluid communication between the inlet port and the outlet port. The quadric surface is provided for extracting contaminants from an effluent stream as the effluent stream flows from the inlet port along the quadric surface to the outlet port.

9 Claims, 11 Drawing Sheets

(51) Int. Cl.
  *B04C 5/00*    (2006.01)
  *B04C 5/103*   (2006.01)
  *B04C 5/081*   (2006.01)
  *B01D 45/16*   (2006.01)
  *B01D 53/26*   (2006.01)
  *B01D 45/18*   (2006.01)
  *B01D 17/02*   (2006.01)
  *A47L 9/10*    (2006.01)
  *A47L 9/16*    (2006.01)
  *B60T 17/00*   (2006.01)

(52) U.S. Cl.
  CPC .......... B01D 53/265 (2013.01); B60T 17/002 (2013.01); B60T 17/004 (2013.01); *B01D 53/261* (2013.01); *B01D 2257/70* (2013.01); *B01D 2257/80* (2013.01); *B01D 2258/06* (2013.01)

(58) Field of Classification Search
  CPC .. B01D 2257/70; B01D 2257/80; B04C 3/00; B04C 5/00; B04C 5/103; B04C 5/081; B04C 45/16; B04C 53/265; B04C 45/18; B04C 53/26; B04C 17/02; B04C 53/261; B04C 2258/06; B04C 2257/70; B04C 2257/80; A47L 9/10; A47L 9/16; A47L 9/1608; Y10S 55/03; B60T 17/004; B60T 17/002
  USPC ......... 55/337, 345, 399, 457, 459.1, DIG. 3; 210/512.1, 788, 806, 807, 261, 304
  See application file for complete search history.

(56) References Cited

U.S. PATENT DOCUMENTS

| | | | | |
|---|---|---|---|---|
| 4,361,425 | A | | 11/1982 | Hata |
| 4,533,475 | A | * | 8/1985 | Chiarito ................. B01D 36/04 210/261 |
| 4,895,582 | A | * | 1/1990 | Bielefeldt .......... B01D 17/0217 55/337 |
| 5,002,593 | A | * | 3/1991 | Ichishita .............. B01D 53/261 55/337 |
| 5,113,671 | A | * | 5/1992 | Westermeyer .......... F25B 43/02 55/337 |
| 5,186,522 | A | | 2/1993 | Spencer |
| 6,109,289 | A | | 8/2000 | Firth |
| 6,129,775 | A | * | 10/2000 | Conrad ................. A47L 9/1608 55/337 |
| 6,319,296 | B1 | | 11/2001 | Fornof |
| 6,537,339 | B2 | | 3/2003 | Schmitz |
| 6,730,143 | B1 | | 5/2004 | Nichols |
| 6,921,424 | B2 | * | 7/2005 | Bugli ..................... B01D 45/16 55/385.3 |
| 7,708,793 | B2 | | 5/2010 | Fornof |
| 7,753,069 | B2 | | 7/2010 | Nichols |
| 7,789,925 | B2 | | 9/2010 | Fornof |
| 8,361,179 | B2 | * | 1/2013 | Guerry .................. B01D 45/16 55/337 |
| 8,431,098 | B2 | * | 4/2013 | Anderson .............. B01D 45/12 204/157.3 |
| 9,101,856 | B2 | | 8/2015 | Quinn |
| 9,440,178 | B2 | * | 9/2016 | Morris ................. B01D 46/521 |
| 9,656,198 | B2 | | 5/2017 | Sugio |
| 2006/0117721 | A1 | * | 6/2006 | Lee ........................ A47L 9/1608 55/337 |
| 2007/0289266 | A1 | * | 12/2007 | Oh ........................ A47L 9/1608 55/337 |
| 2014/0116534 | A1 | * | 5/2014 | Howell ................ B01D 53/261 137/334 |
| 2016/0114777 | A1 | * | 4/2016 | Tomchak .............. B60T 17/004 96/139 |
| 2017/0340997 | A1 | | 11/2017 | Otsuka |
| 2019/0100190 | A1 | * | 4/2019 | Howe ................... B60T 13/662 |

FOREIGN PATENT DOCUMENTS

| | | |
|---|---|---|
| EP | 3216509 A1 | 9/2017 |
| FR | 2224211 A1 | 10/1974 |
| GB | 1094617 A | 12/1967 |
| JP | 20050664470 A | 3/2005 |

OTHER PUBLICATIONS

Choi, Sung-Jin et al. "A Polymethylsiloxane (PDMS) Sponge for the Selective Absorption of Oil from Water," Paper, Nov. 10, 2011, 5 pages, American Chemical Society, U.S.A.

Parker Hannifin Manufacturing Limited, "OVR Oil Vapour Removal Filter," Product Information Sheet, Apr. 2015, 4 pages, Parker Hannifin Manufacturing Limited, England.

European Patent Office, International Search Report and Written Opinion of the International Searching Authority, Report, dated Dec. 14, 2018, 8 pages, European Patent Office, Rijswijk Netherlands.

* cited by examiner

EFFLUENT PROCESSING APPARATUS FOR A VEHICLE AIR BRAKE CHARGING SYSTEM

BACKGROUND

The present application relates to vehicle air brake charging systems, and is particularly directed to an effluent processing apparatus for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes both water vapor and oil droplets from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. Accordingly, those skilled in the art continue with research and development efforts in cleaning the purged air from purge valves.

SUMMARY

In accordance with one embodiment, an effluent processing apparatus is provided for a vehicle air brake charging system. The effluent processing apparatus comprises an inlet port through which effluent from a purge valve of an air dryer can be received and an outlet port. The effluent processing apparatus further comprises a quadric surface defining an effluent flow chamber that is connected in fluid communication between the inlet port and the outlet port. The quadric surface is provided for extracting contaminants from an effluent stream as the effluent stream flows from the inlet port along the quadric surface to the outlet port.

In accordance with another embodiment, an effluent processing apparatus is provided for a vehicle air brake charging system. The effluent processing apparatus comprises an inlet opening through which effluent from a purge valve of an air dryer can be received and an outlet opening that is smaller than the inlet opening. The effluent processing apparatus further comprises a surface defining an effluent flow chamber that extends between the inlet opening and the outlet opening. The surface is provided for extracting contaminants from an effluent stream as the effluent stream flows from the inlet opening along the surface to the outlet opening.

In accordance with yet another embodiment, an effluent processing apparatus is provided for a vehicle air brake charging system. The effluent processing apparatus comprises an inlet port through which effluent from a purge valve of an air dryer can be received and an outlet port. The effluent processing apparatus further comprises means for directing an effluent stream from the purge valve into a vortex flow to extract contaminants from the effluent stream as the effluent stream flows from the inlet port to the outlet port.

DETAILED DESCRIPTION

Figure 1:
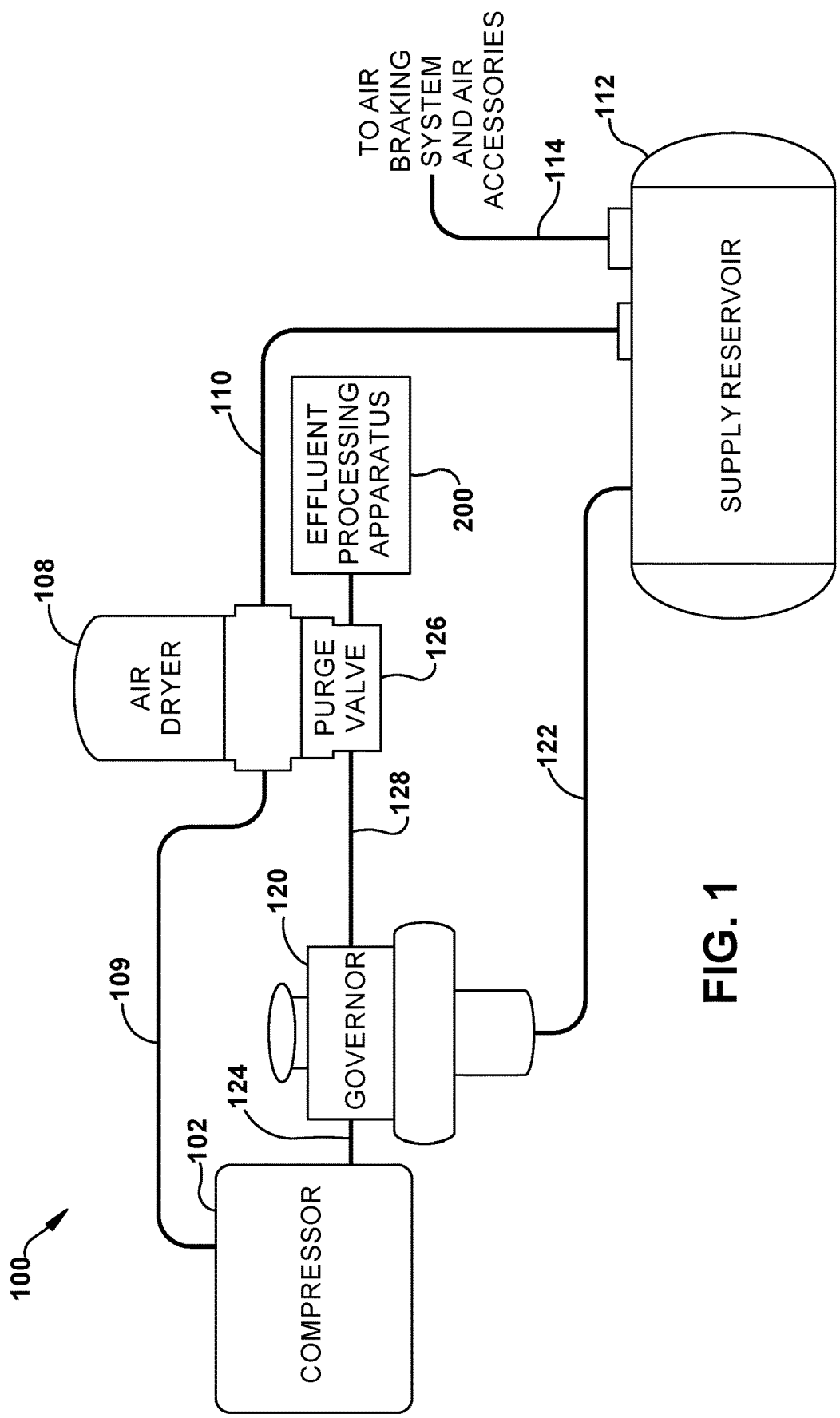
FIG. 1 is a schematic diagram of a vehicle air brake charging system including an effluent processing apparatus constructed in accordance with an embodiment.

Referring to FIG. 1, a schematic diagram of a vehicle air brake charging system 100 including an effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2:
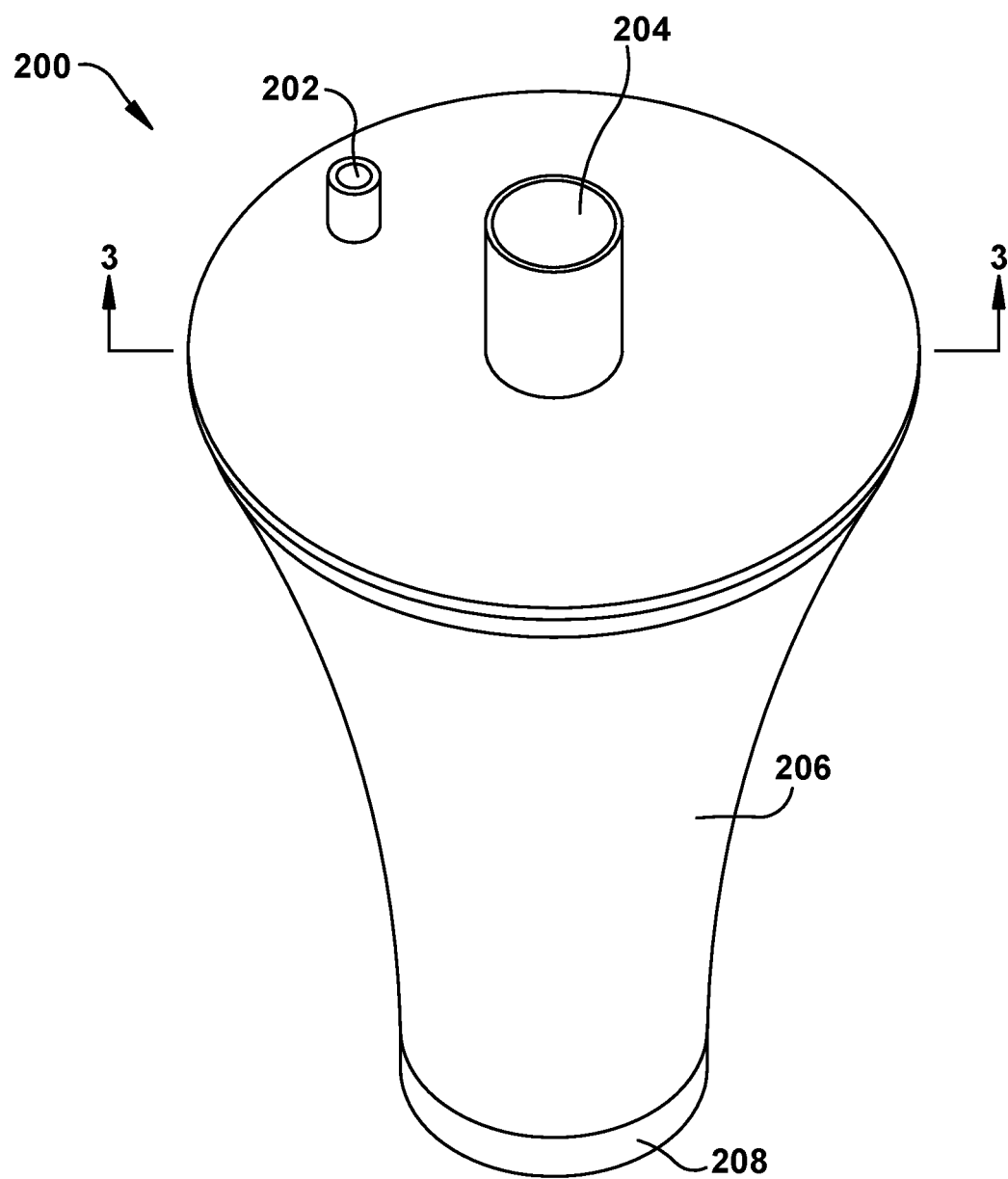
FIG. 2 is a perspective view of an example effluent processing apparatus that can be implemented in the vehicle air brake charging system shown in FIG. 1.

Referring to FIG. 2, a perspective view of an example effluent processing apparatus 200 that can be implemented in the vehicle air brake charging system 100 shown in FIG. 1 is illustrated. The effluent processing apparatus 200 includes an inlet port portion 202, an outlet port portion 204, a quadric surface portion 206, and a separating sump portion 208, as will be described hereinbelow. Example overall physical dimensions of the effluent processing apparatus 200 are between about two inches (5.1 centimeters) and ten inches (25.4 centimeters) in diameter, and no greater than about ten inches (25.4 centimeters) in height.

Figure 3A:
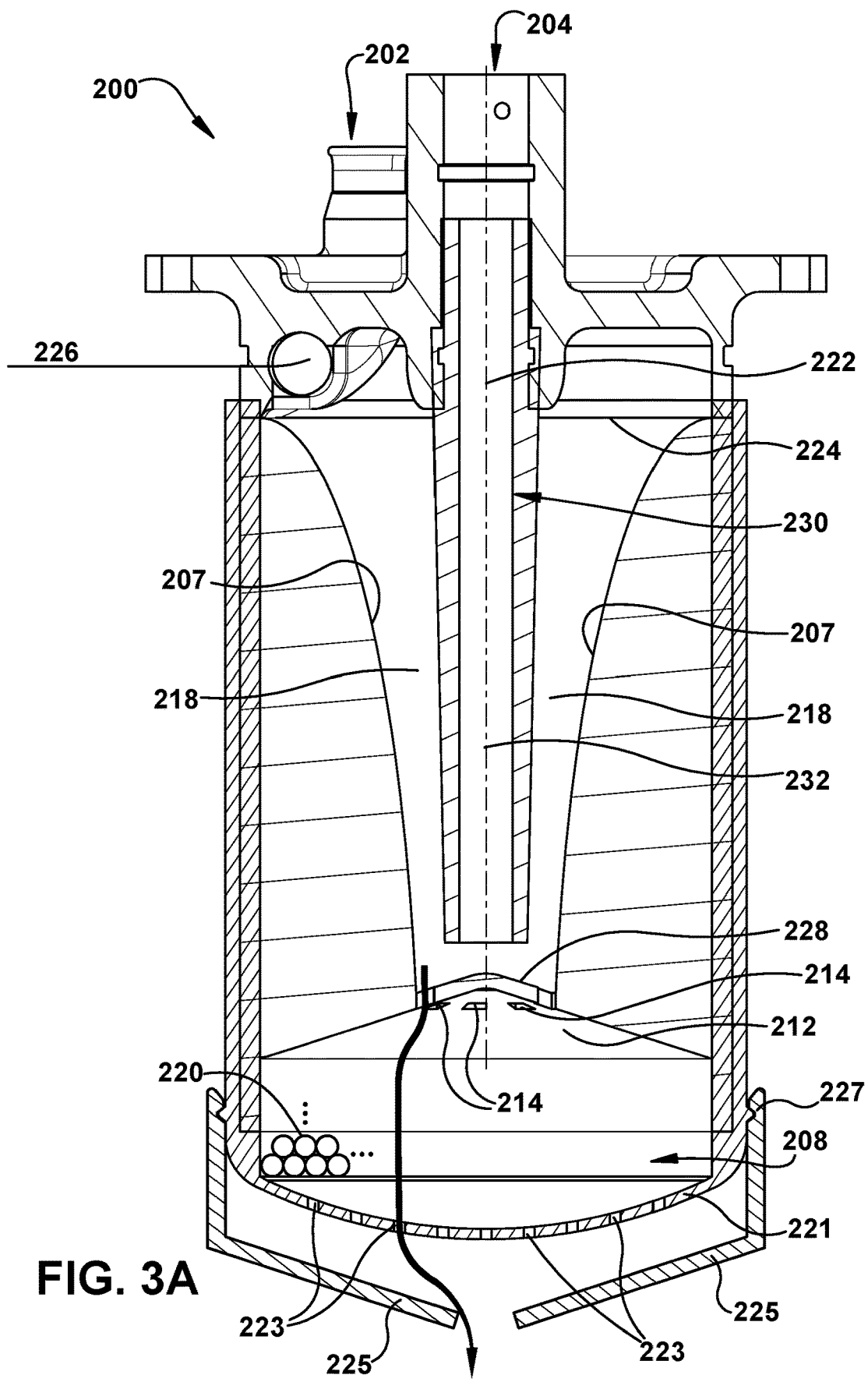
FIGS. 3A, 3B, 3C, 3D, and 3E are each a sectional elevation view taken approximately along line 3-3 shown in FIG. 2, and showing details of a quadric surface in the effluent processing apparatus.

Referring to FIG. 3A, a sectional elevation view taken approximately along line 3-3 shown in FIG. 2 is illustrated. In particular, FIG. 3A shows details of an example quadric surface 207 in the effluent processing apparatus 200. The example quadric surface 207 shown in FIG. 3A is an inverted paraboloid. The quadric surface 207 is sometimes referred to as a "quadratic surface" that is represented by a corresponding quadratic equation. Relationships between quadric surfaces and their corresponding quadratic equations are known and, therefore, will not be described.

The quadric surface 207 defines an effluent flow chamber 218 that is connected in fluid communication between the inlet port 202 and the outlet port 204. Effluent from the purge valve 126 of the air dryer 108 (FIG. 1) is received tangentially at the inlet port 202. The quadric surface 207 has a center axis 222. The quadric surface 207 is provided for extracting contaminants from an effluent stream as the effluent stream flows from the inlet port 202 along the quadric surface 207 to the outlet port 204. Contaminants in the effluent stream include, but are not limited to, water vapor and oil droplets in an aerosol. In some embodiments, a select one or more of a fine mesh, sponge, and coalescing media is coated and/or adhered on the quadric surface 207 for increasing contaminant extraction efficiency of the quadric surface 207.

As shown in FIG. 3A, an inlet opening 224 to the effluent flow chamber 218 is provided through which effluent from the purge valve 126 of the air dryer 108 can be received. The inlet opening 224 is located at one end of the effluent flow chamber 218. An air entrance 226 interconnects the inlet port 202 and the inlet opening 224, and changes the effluent flow direction from a vertical flow at the inlet port 202 to a horizontal flow at the inlet opening 224. An outlet opening 228 that is smaller than the inlet opening 224 is provided at the opposite end of the effluent flow chamber 218. Accordingly, the effluent stream flows from the relatively larger inlet opening 224 to the relatively smaller outlet opening 228 as the effluent stream flows through the effluent flow chamber 218.

Also as shown in FIG. 3A, a stand pipe 230 has one end disposed in the effluent flow chamber 218 and an opposite end connected to the outlet port 204. The stand pipe 230 has a longitudinal central axis 232 that is concentric to the center axis 222 of the quadric surface 207.

The separating sump 208 contains filtration media, designated as small circles "220" in the separating sump 208. The separating sump 208 containing the filtration media 220 is disposed in the vicinity of the outlet opening 228. The separating sump 208 is disposed below the quadric surface 207 and the stand pipe 230 as shown in FIG. 3A. The separating sump 208 has a floor 212 with a number of floor openings 214 that allow fluid communication between the effluent flow chamber 218 and the volume of the separating sump 208 containing the filtration media 220.

The separating sump 208 containing the filtration media 220 is provided for receiving and holding extracted contaminants until the extracted contaminants can be removed from the separating sump 208. In some embodiments, the filtration media 220 includes a sponge material. In some embodiments, the filtration media 220 includes a generic hydrophobic material. In some embodiments, the separating sump 208 containing filtration media 220 is detachable as a cartridge to allow the separating sump 208 to be removed as a unit and replaced with another separating sump.

The separating sump 208 has a bottom panel 221 that has a number of drain openings 223 dispersed throughout the bottom panel 221. A baffle system 225 protects the drain openings 223. The baffle system 225 is secured to the separating sump 208 using a snap-on mechanism 227.

During operation of the effluent processing apparatus 200, effluent (i.e., air containing oil and water in the form of liquid and aerosol) from the purge valve 126 of the air dryer 108 is forced vertically through the inlet port 202 and then horizontally through the air entrance 226 into the effluent flow chamber 218. The effluent from the purge valve 126 of the air dryer 108 may be received through a piece of tubing or other material that is connected between the exhaust of the air dryer 108 and the input port 202 of the effluent processing apparatus 200. The piece of tubing can have a decreasing diameter such that the effluent flow from the air dryer 108 would already be increased prior to reaching the effluent processing apparatus 200. The effluent then flows downward into the effluent flow chamber 218, and impacts the quadric surface 207. The downward impact of the effluent stream against the quadric surface 207 causes the heavier aerosols and liquid droplets to adhere to the quadric surface 207 and separate apart from the effluent stream.

As liquids separate apart from the effluent stream, the liquids run down walls of the quadric surface 207 and drain through the floor openings 214 in the floor 212 into the volume of the separating sump 208 containing the filtration media 220. The filtration media 220 holds the oil contaminants contained in the separated liquid, and the water contaminants contained in the separated liquid are allowed to drain through the drain openings 223 in the bottom panel 221. The filtration media 220 holds the oil contaminants until the filtration media 220 or the separating sump 208, or both, are replaced. The effluent stream with the contaminants (i.e., the oil and the water) removed then flows upward through the stand pipe 230 and out through the outlet port 204 to atmosphere.

Figure 5:
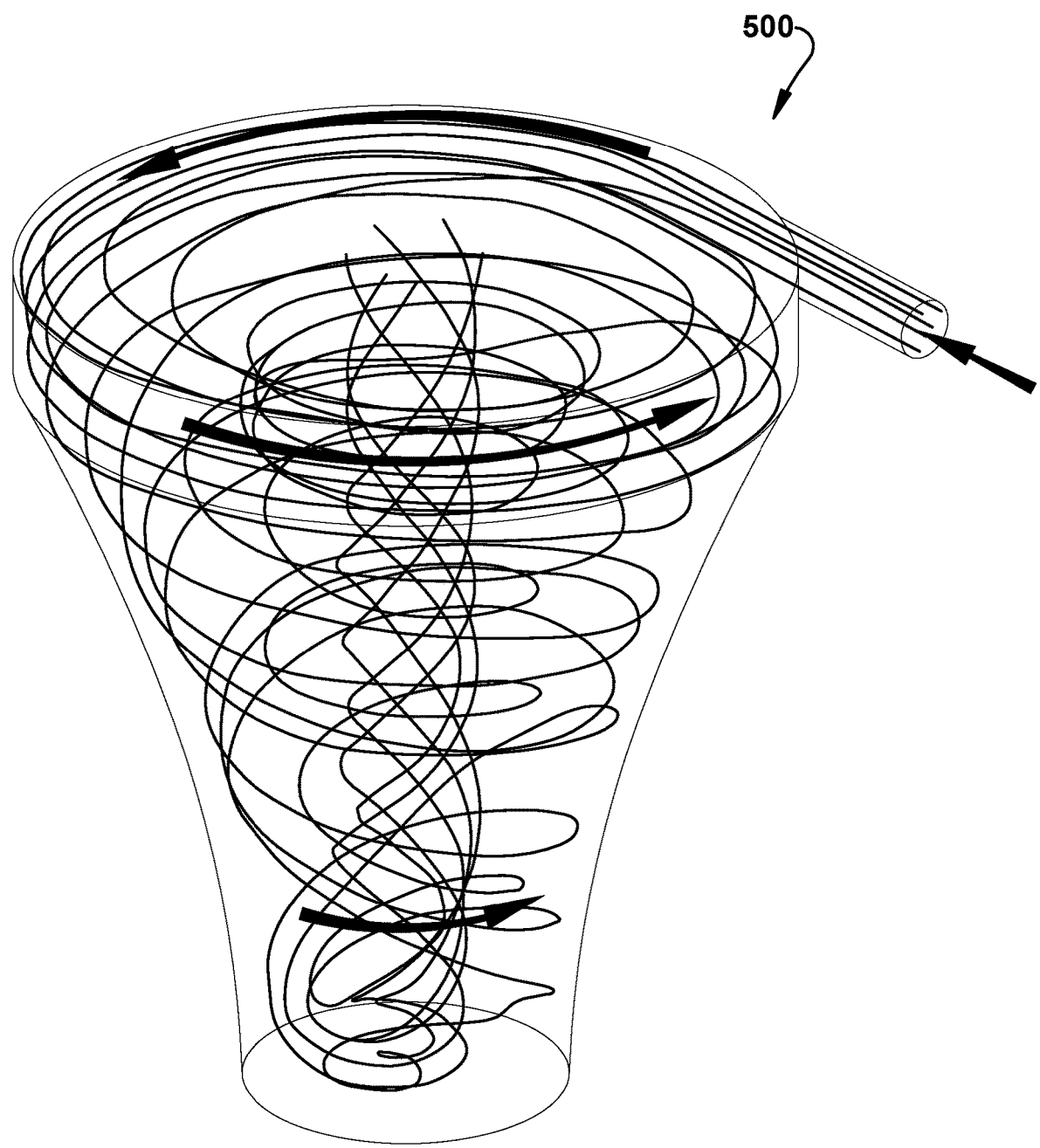
FIG. 5 is a velocity streamline diagram depicting an example effluent flow pattern along the quadric surface shown in FIG. 3A.

Referring to FIG. 5, a velocity streamline diagram 500 depicting an example effluent flow pattern from the inlet port 202 and along the quadric surface 207 to the separating sump 208 is illustrated. In general, the streamlines flow in the direction indicated by the solid arrows beginning at the inlet port 202, passing along the quadric surface 207, and ending at the separating sump 208. The velocity range of the streamlines shown in FIG. 5 is between about 0.15 millimeters per second at the slowest and about 33.1 meters per second at the fastest. The streamlines of different velocities cross each other as the streamlines flow from the input port 202 along the quadric surface 207 to the separating sump 208.

Figure 3B:
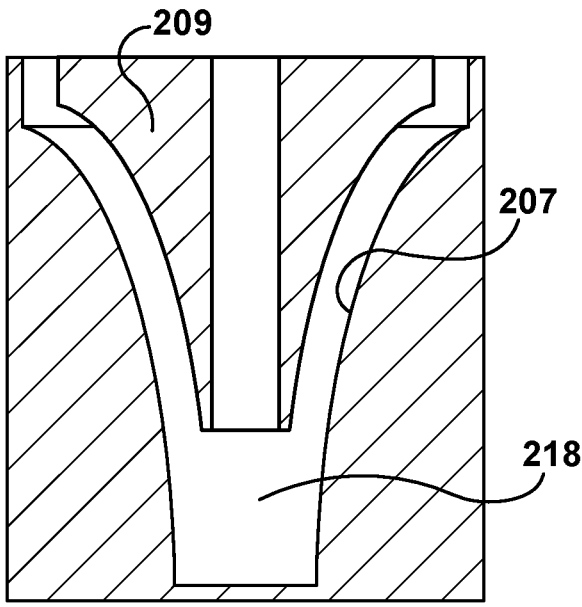

Although the above description describes the effluent flow chamber 218 having the amount of space shown in FIG. 3A, it is conceivable that dead air space in the chamber 218 can be removed. For example as shown in FIG. 3B, an insert piece 209 that is geometrically similar to the quadric surface 207 is provided in the chamber 218 to remove dead air space. By removing dead air space in the chamber 218, velocity losses incurred by accelerating dead air are avoided.

Figure 3C:
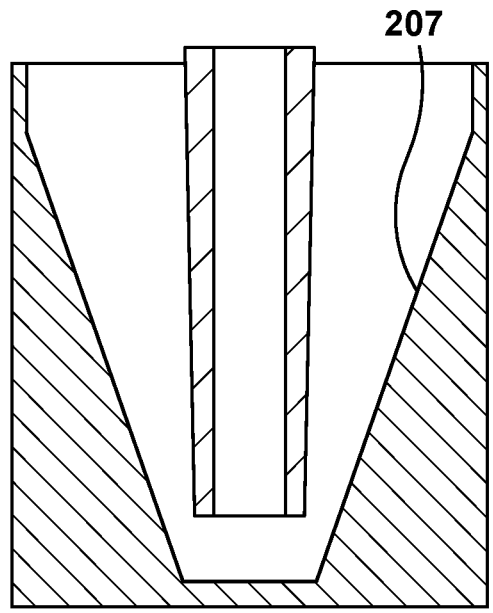
Figure 3D:
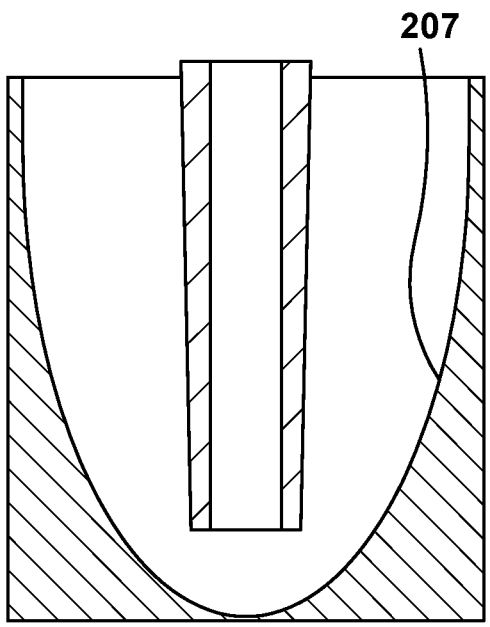
Figure 3E:
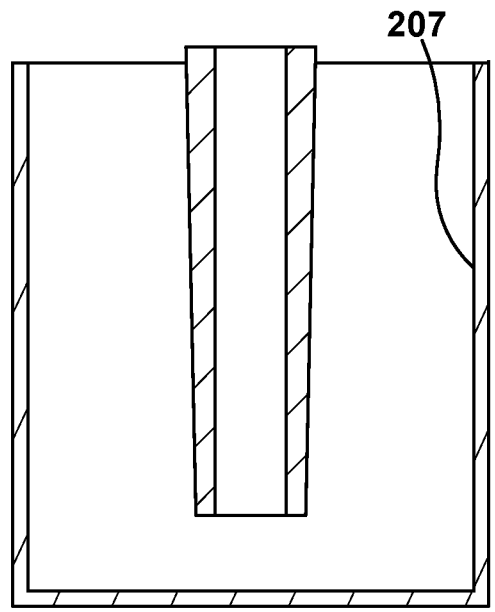

It is also conceivable that the quadric surface 207 can have a shape that is other than an inverted paraboloid shown in FIG. 3A. For example as shown in FIG. 3C, the quadric surface 207 may have the shape of a truncated cone. As another example shown in FIG. 3D, the quadric surface 207 may have the shape of a paraboloid. As yet another example shown in FIG. 3E, the quadric surface 207 may have the shape of a circular cylinder.

Figure 4A:
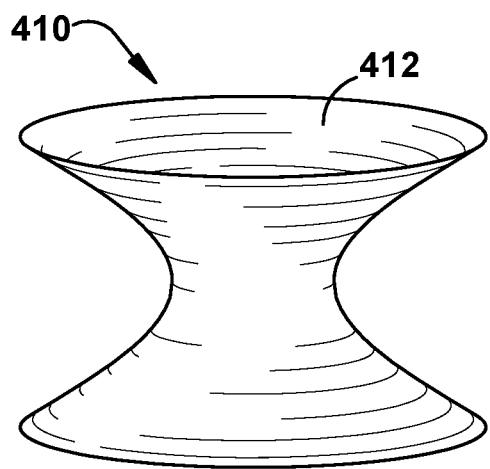
FIGS. 4A, 4B, 4C, and 4D are diagrams of other example quadric surfaces that can be implemented in the effluent processing apparatus of FIG. 2.
Figure 4B:
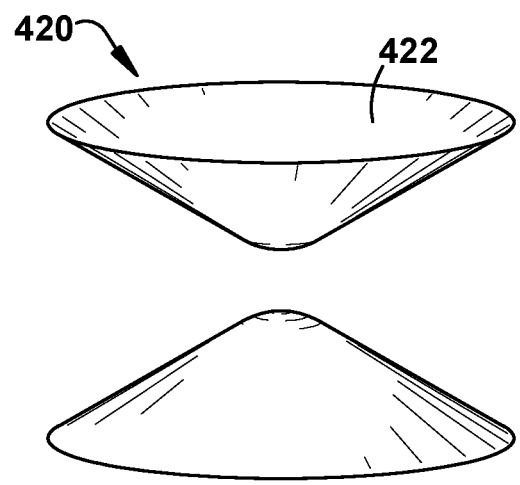
Figure 4C:
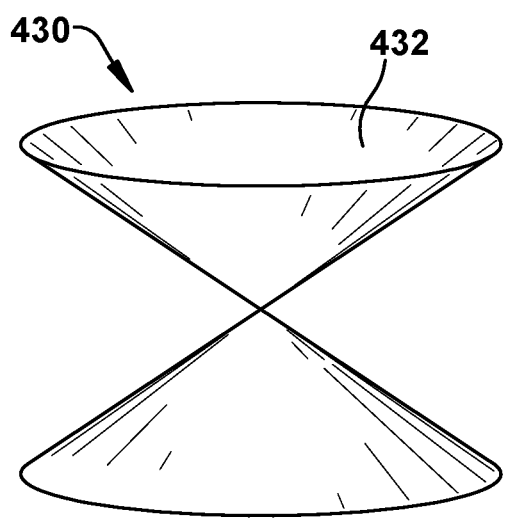
Figure 4D:
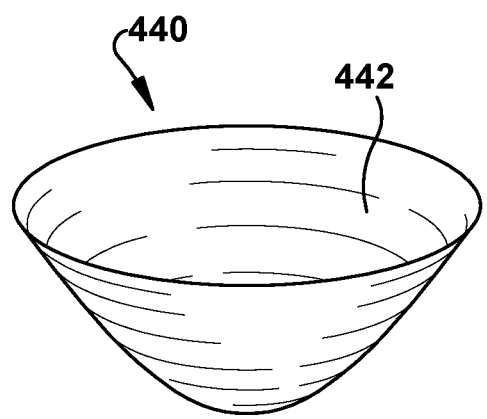

Referring to FIGS. 4A, 4B, 4C, and 4D, diagrams of other example quadric surfaces that can be implemented in the effluent processing apparatus 200 of FIG. 2 are illustrated. More specifically, FIG. 4A shows a hyperboloid of one sheet 410 having a surface curvature 412. FIG. 4B shows a hyperboloid of two sheets 420 having a surface curvature 422. FIG. 4C shows a cone 430 having a surface curvature 432. FIG. 4D shows an elliptic paraboloid 440 having a surface curvature 442. These are only example quadric surfaces with their corresponding surface curvatures. Other quadric surfaces are possible.

It should be apparent that the downward flow of the effluent stream into the effluent flow chamber 218 against the quadric surface 207 results in a vortex flow that increases extraction of contaminants from the effluent stream. It should also be apparent that the drainage of oil and water through the floor openings 214 in the floor 212 allows for more efficient exposure of contaminants in the effluent stream to the filtration media 220 in the separating volume of the separating sump 208. The result is cleaner air being expelled to atmosphere, and less oil being deposited and accumulated on roadways.

It should further be apparent that the effluent processing apparatus 200 comprises two processing stages. The quadric surface 207 comprises a first processing stage, and the separating sump 208 provides a second processing stage. With two processing stages, the effluent processing apparatus 200 produces minimal back pressure on the purge valve 126 (FIG. 1). Moreover, since the effluent processing apparatus 200 is not pressurized, either the first processing stage or the second processing stage, or both, can be made of plastic material. In some embodiments, the entire effluent processing apparatus 200 comprises plastic material.

It should also be apparent that means is provided for directing an effluent stream from a purge valve of an air dryer into a vortex flow to extract contaminants from the effluent stream as the effluent stream flows from an inlet port to an outlet port. In some embodiments, the directing means includes a surface, such as a quadric surface, disposed between the inlet port and the outlet port and for extracting contaminants from the effluent stream. In some embodiments, the quadric surface includes a surface curvature of at least a portion of a select one of an inverted paraboloid, a hyperboloid of one sheet, a hyperboloid of two sheets, a cone, an elliptic paraboloid, a truncated cone, and a paraboloid.

Figure 6:
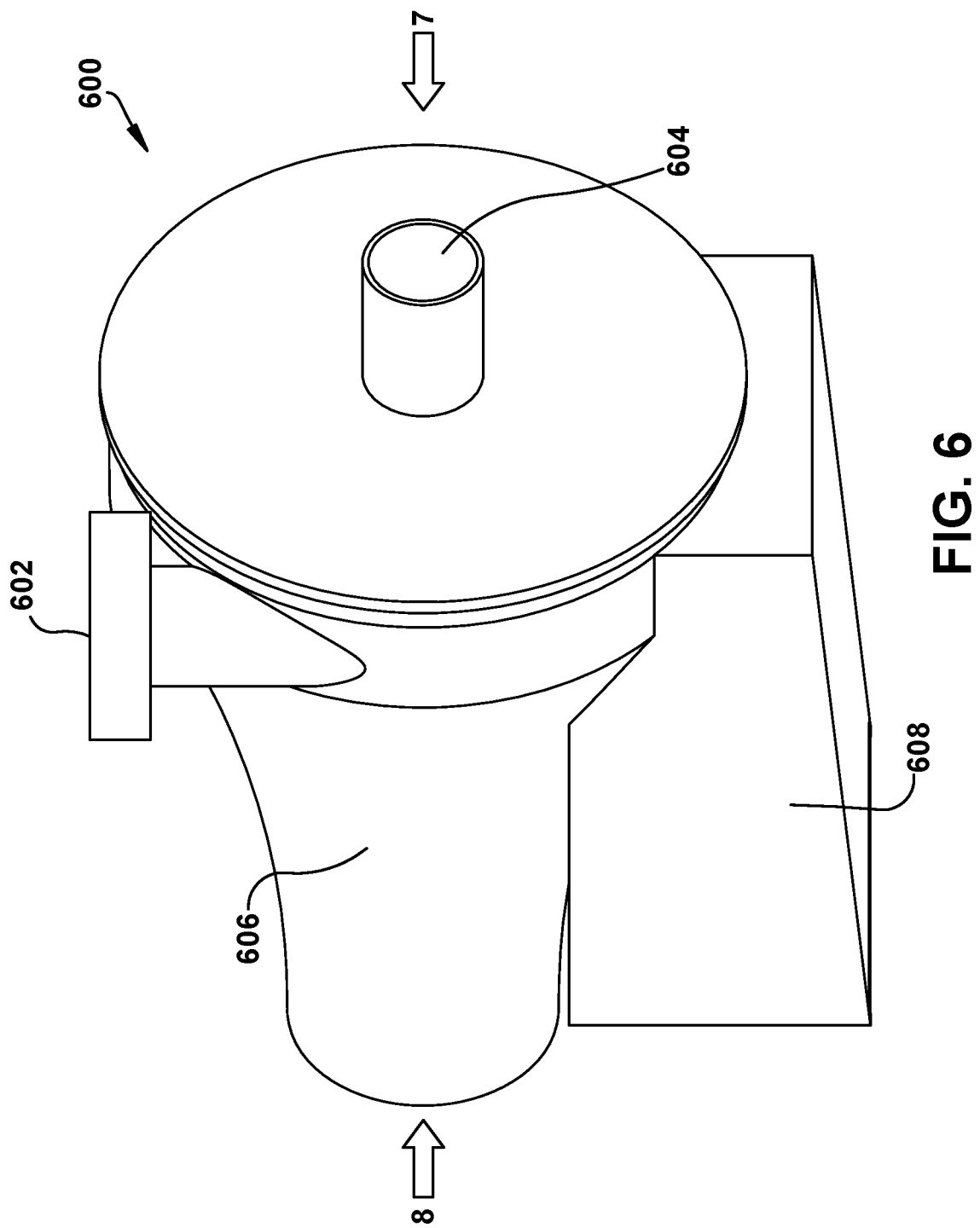
FIG. 6 is a perspective view similar to FIG. 2, and showing another example effluent processing apparatus.

Referring to FIG. 6, a perspective view of another example effluent processing apparatus 600 is illustrated. The effluent processing apparatus 600 is similar to the effluent processing apparatus 200 shown in FIGS. 2 and 3A. As such, like components are illustrated with like reference numerals 400 higher than shown in FIGS. 2 and 3A.

Figure 7:
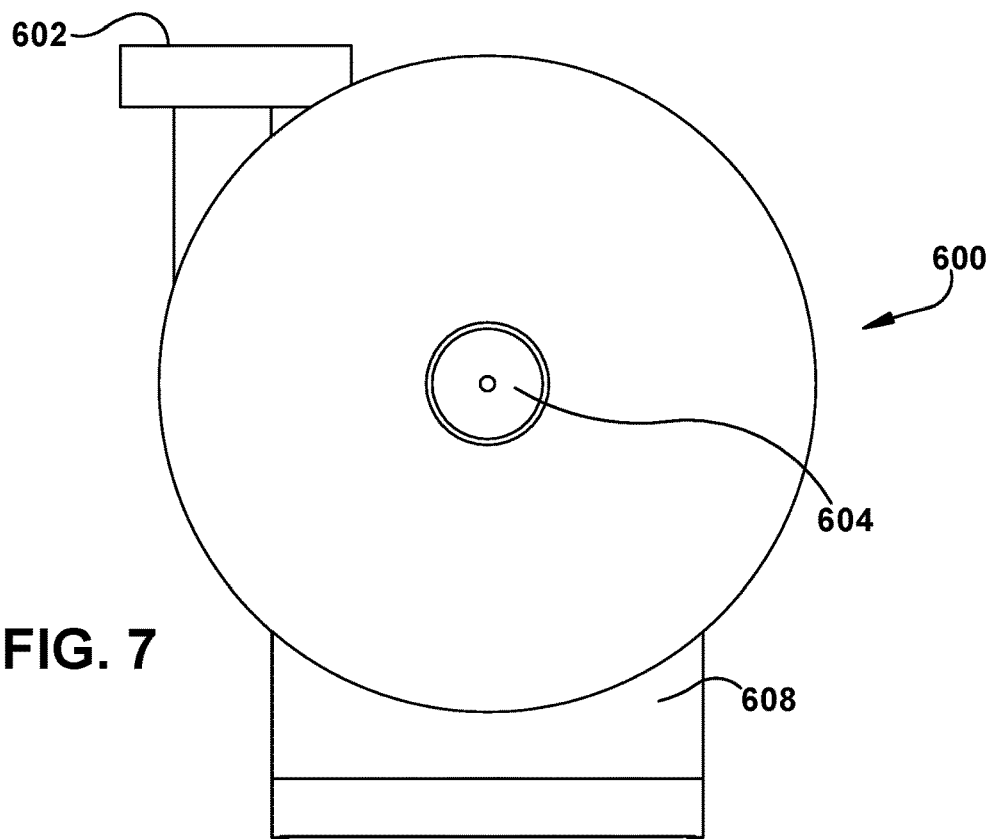
FIG. 7 is a front view, looking approximately in the direction of arrow "7" shown in FIG. 6, of the effluent processing apparatus of FIG. 6.
Figure 8:
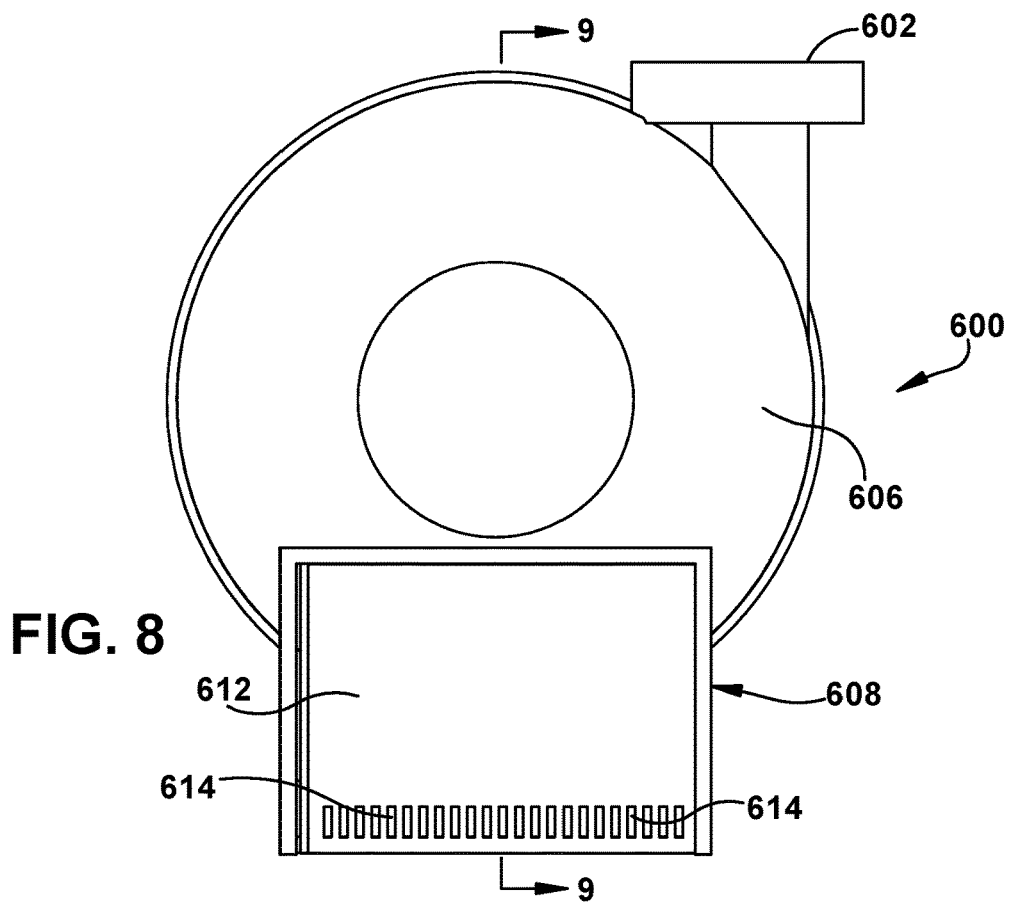
FIG. 8 a back view, looking approximately in the direction of arrow "8" shown in FIG. 6, of the effluent processing apparatus of FIG. 6.
Figure 9:
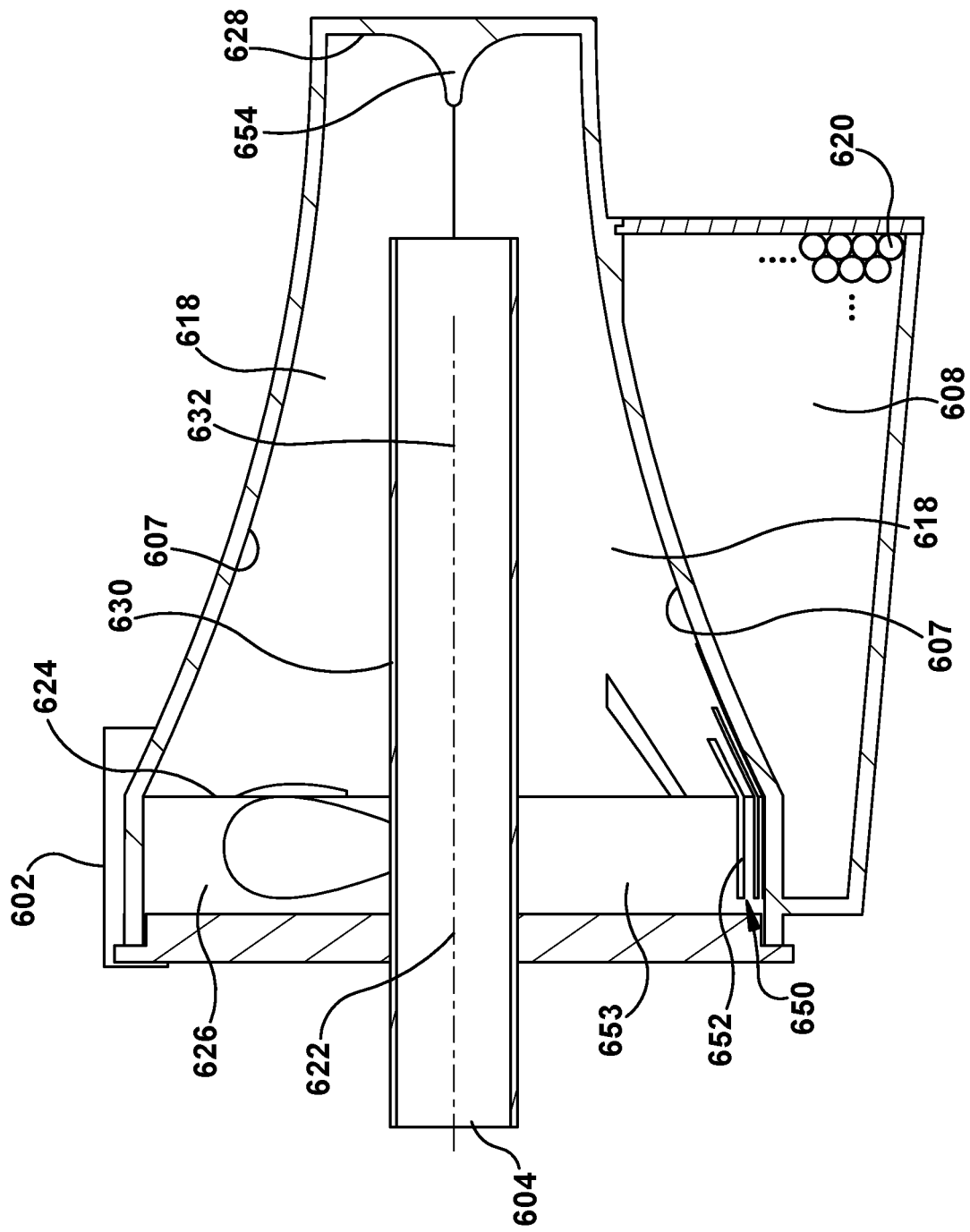
FIG. 9 is a sectional elevational view taken approximately along line 9-9 shown in FIG. 8, and showing details of a quadric surface in the effluent processing apparatus.

FIG. 7 is a top view, looking approximately in the direction of arrow "7" shown in FIG. 6, of the effluent processing apparatus 600 of FIG. 6. FIG. 8 a bottom view, looking approximately in the direction of arrow "8" shown in FIG. 6, of the effluent processing apparatus 600 of FIG. 6. FIG. 9 is a sectional elevational view taken approximately along line 9-9 shown in FIG. 8. In particular, FIG. 9 shows details of an example quadric surface in the effluent processing apparatus 600.

Referring to FIGS. 6, 7, and 8, the effluent processing apparatus 600 includes an inlet port portion 602, an outlet port portion 604, a quadric surface portion 606 having a quadric surface 607, and a separating sump portion 608, as will be described hereinbelow.

As shown in FIG. 9, the quadric surface 607 defines an effluent flow chamber 618 that connects in fluid communication the inlet port 602 and the outlet port 604. Effluent from the purge valve 126 of the air dryer 108 (FIG. 1) is received at the inlet port 602. The quadric surface 607 has a center axis 622. The quadric surface 607 is provided for extracting contaminants from an effluent stream as the effluent stream flows from the inlet port 602 along the quadric surface 607 to the outlet port 604. Contaminants in the effluent stream include, but are not limited to, water vapor and oil droplets in an aerosol. In some embodiments, a select one of a fine mesh, sponge, and coalescing media is coated and/or adhered on the quadric surface 607 for increasing contaminant extraction efficiency of the quadric surface 607.

An inlet opening 624 to the effluent flow chamber 618 is provided through which effluent from the purge valve 126 of the air dryer 108 can be received. The inlet opening 624 is located at one end of the effluent flow chamber 618. An air entrance 626 interconnects the inlet port 602 and the inlet opening 624. An outlet opening 628 that is smaller than the inlet opening 624 is provided at the opposite end of the effluent flow chamber 618. Accordingly, the effluent stream flows from the relatively larger inlet opening 624 to the relatively smaller outlet opening 628 as the effluent stream flows through the effluent flow chamber 618.

Also as shown in FIG. 9, a stand pipe 630 has one end disposed in the effluent flow chamber 618 and an opposite end connected to the outlet port 604. The stand pipe 630 has a longitudinal central axis 632 that is concentric to the center axis 622 of the quadric surface 607.

A separating sump 608 contains filtration media, designated as small circles "620" in the separating sump 608. The separating sump 608 containing filtration media 620 is disposed along bottom side of the quadric surface 607. The separating sump 608 has a wall 612 (FIG. 8) with wall openings 614 that allow fluid communication between the effluent flow chamber 618 and the volume of the separating sump 608 containing the filtration media 620.

The separating sump 608 containing the filtration media 620 is provided for receiving and holding extracted contaminants until the extracted contaminants can be removed from the separating sump 608. In some embodiments, the filtration media 620 includes a sponge material. In some embodiments, the filtration media 620 includes a generic hydrophobic material. In some embodiments, the separating sump 608 containing filtration media 620 is detachable as a cartridge to allow the separating sump 608 to be removed as a unit and replaced with another separating sump.

Referring again to FIG. 9, a transition area 650 fluidly interconnects the effluent flow chamber 618 and the volume of the separating sump 608. More specifically, the transition area 650 includes a number of slits 652 that are formed in a wall 653 of the quadric surface 607. The slits 652 are small enough to prevent flow disruption of effluent while still allowing extracted contaminants to drain. The slits 652 are about 0.8 inches (2.0 centimeters) wide, and function as drain passages for extracted contaminants. A vortex inducer projection 654 is disposed at one end of the quadric surface 607. The vortex inducer projection 654 is centered along the longitudinal central axis 632 of the stand pipe 630 and the center axis 622 of the quadric surface 607.

During operation of the effluent processing apparatus 600, effluent (i.e., air containing oil and water in the form of liquid and aerosol) from the purge valve 126 of the air dryer 108 is forced through the inlet port 602 and then through the air entrance 626. The effluent stream impacts against the transition area 650. The effluent stream impacting against the transition area 650 causes the heavier aerosols and liquid droplets to adhere to the quadric surface 607 and separate apart from the effluent stream.

The liquids run along the wall 653 of the quadric surface 607 and drain through the slits 652 in the wall 653 into the volume of the separating sump 608. The filtration media 620 holds the contaminants (i.e., the oil and the water) until the filtration media 620 or the separating sump 608, or both, are replaced. The vortex inducer projection 654 provides a surface against which the effluent stream that has been processed through the effluent flow chamber 618 (i.e., the effluent with contaminants removed) can be deflected sideways into the stand pipe 630. The cleaned air (i.e., the effluent with contaminants removed) then flows sideways through the stand pipe 630 and out through the outlet port 604 to atmosphere.

It should be apparent that the effluent processing apparatus 600 shown in FIGS. 6-9 has a horizontal orientation/configuration as compared to the vertical orientation/configuration of the effluent processing apparatus 200 shown in FIGS. 2 and 3A. This is because the separating sump 608 of the effluent processing apparatus 600 of FIGS. 6-9 is side-mounted, whereas the separating sump 208 of the effluent processing apparatus 200 of FIGS. 2 and 3A is bottom-mounted. In the horizontal orientation/configuration shown in FIGS. 6-9, effluent flows along the quadric surface 607 from the wider part of the vortex to the narrower part of the vortex.

The horizontal orientation/configuration of the effluent processing apparatus 600 shown in FIGS. 6-9 provides a number of advantages. Since the separating sump 608 is side-mounted, one advantage is that the path of the quadric surface 607 can be longer without height penalties. Another advantage is that the side-mounted separating sump 608 can be longer. The longer separating sump 608 can store more filtration media 220, and provides a longer path through the separating sump 608. This increases separating efficiency in the separating sump 608. Moreover, the cleaned air that is exhausted through the outlet opening 604 is spaced farther apart from the drained contaminants in the separating sump 608 when the horizontal orientation/configuration of the effluent processing apparatus 600 shown in FIGS. 6-9 is implemented.

Figure 10:
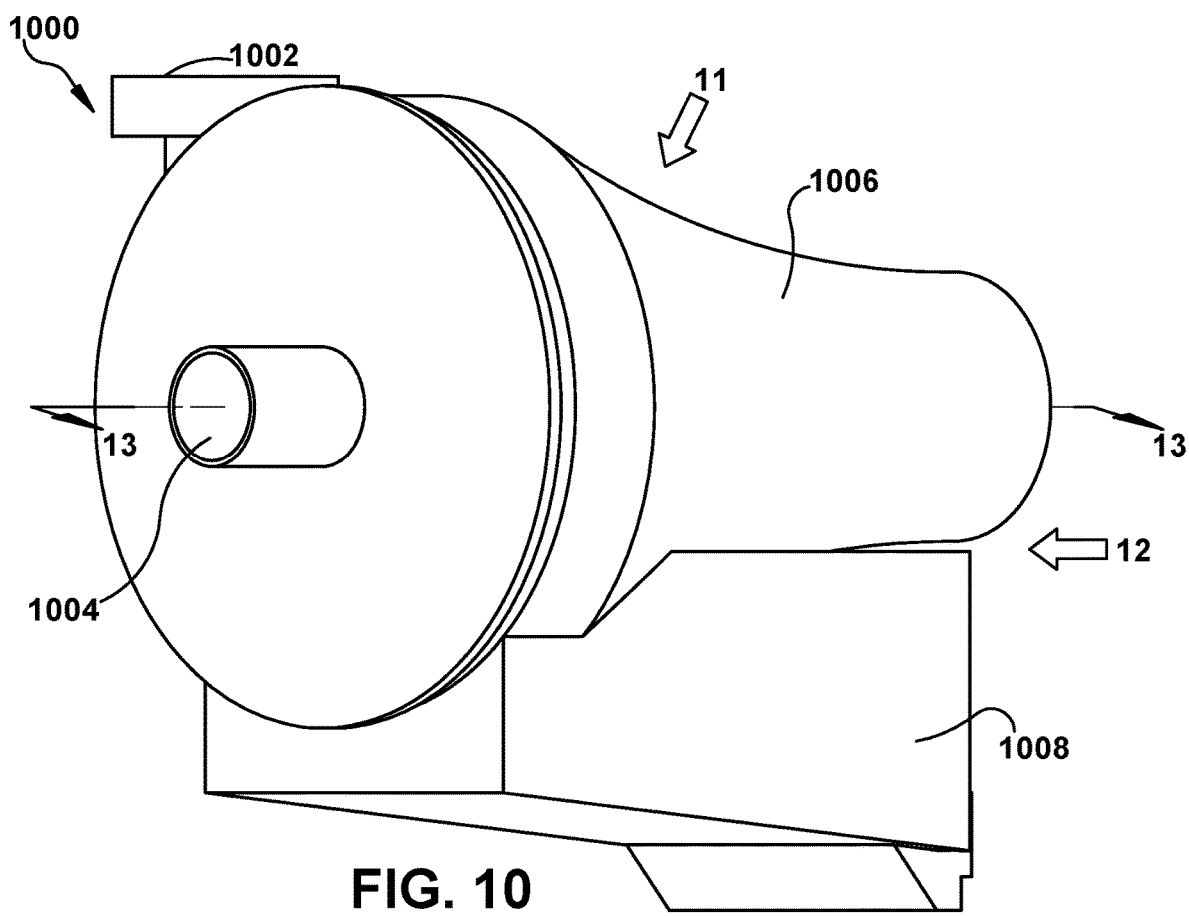
FIG. 10 is a perspective view similar to FIG. 6, and showing another example effluent processing apparatus.

Referring to FIG. 10, a perspective view of another example effluent processing apparatus 1000 is illustrated. The effluent processing apparatus 1000 is similar to the effluent processing apparatus 600 shown in FIG. 6. As such, like components are illustrated with like reference numerals 400 higher than shown in FIG. 6.

Figure 11:
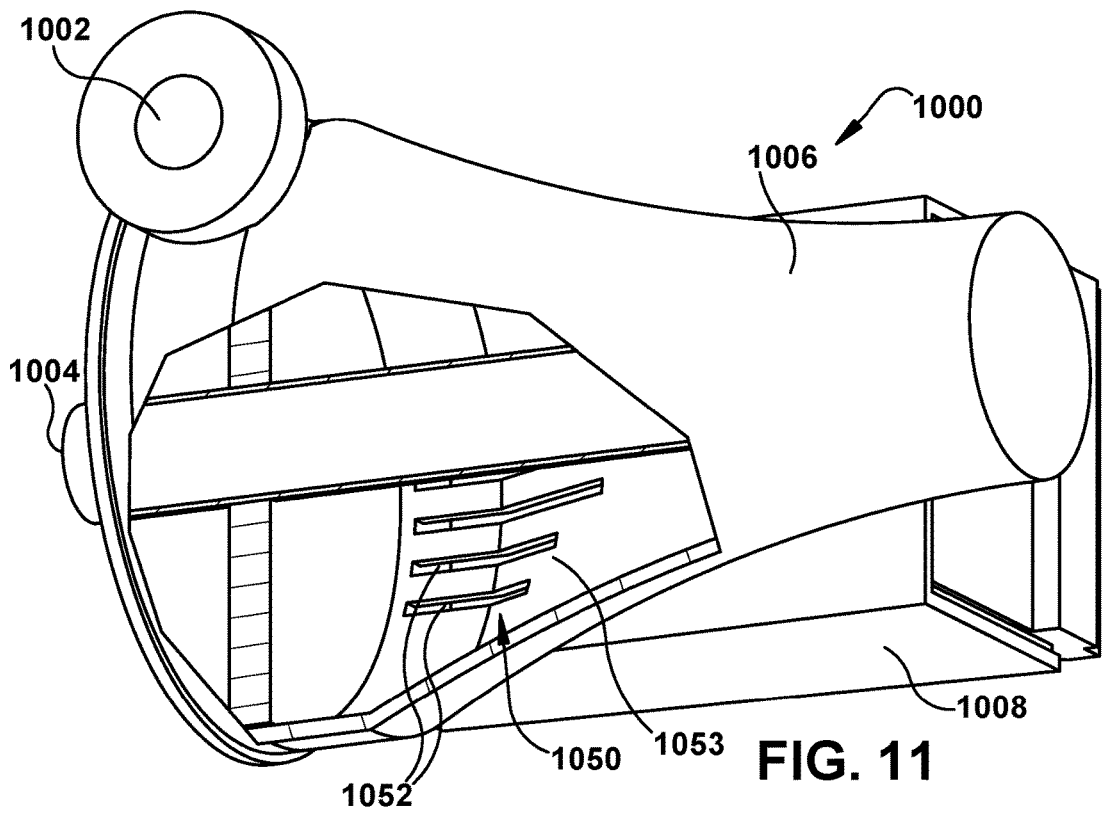
FIG. 11 is a view with a portion of a wall removed, looking approximately in the direction of arrow "11" shown in FIG. 10, of the effluent processing apparatus of FIG. 10.
Figure 12:
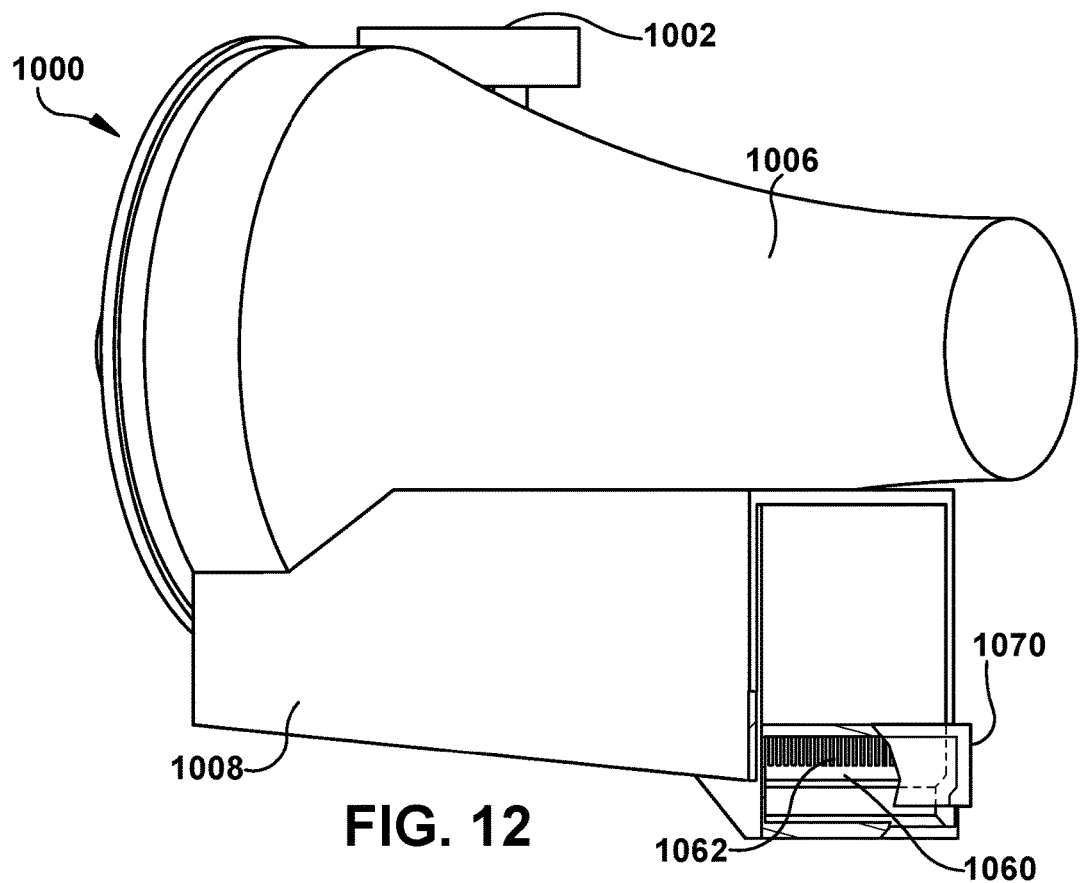
FIG. 12 is a view, looking approximately in the direction of arrow "12" shown in FIG. 10, of the effluent processing apparatus of FIG. 10.
Figure 13:
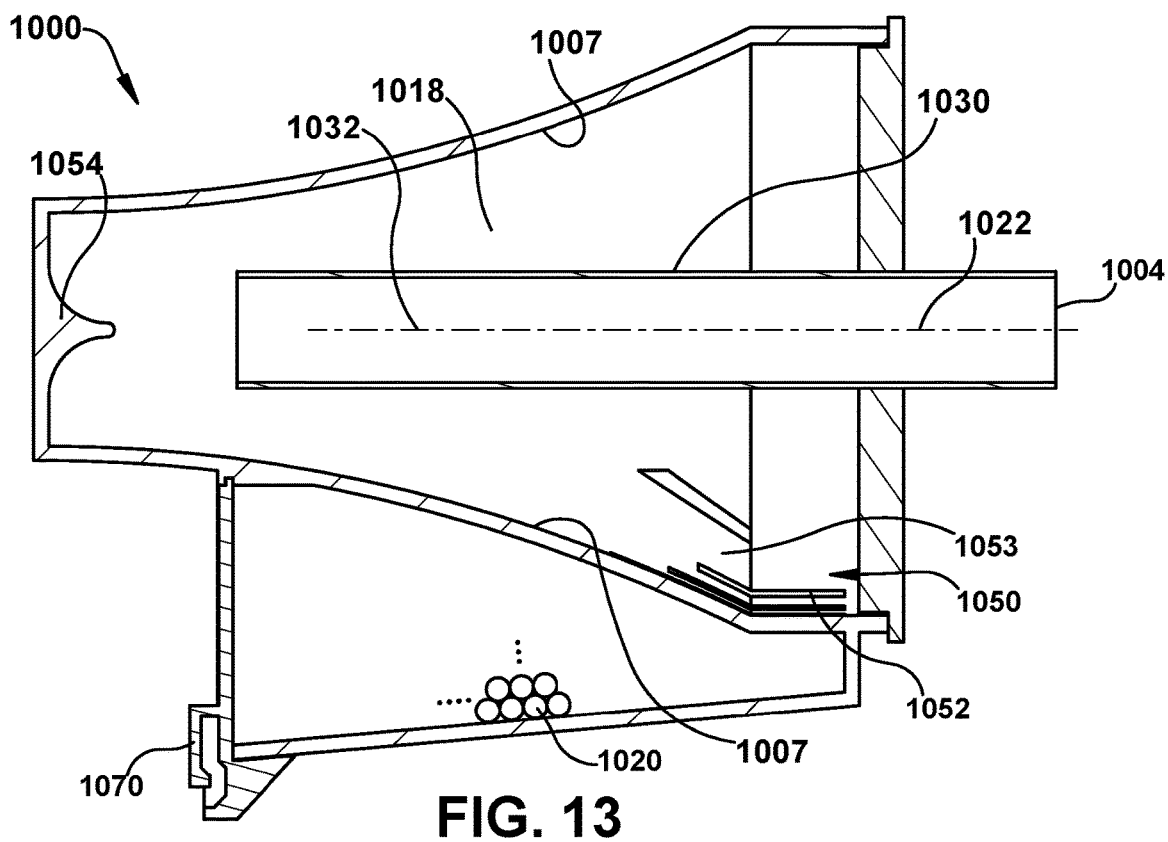
FIG. 13 is a sectional elevational view taken approximately along line 13-13 shown in FIG. 10, and showing details of a quadric surface in the effluent processing apparatus.

FIG. 11 is a view with a portion of a wall removed, looking approximately in the direction of arrow "11" shown in FIG. 10, of the effluent processing apparatus of FIG. 10. FIG. 12 is a view, looking approximately in the direction of arrow "12" shown in FIG. 10, of the effluent processing apparatus of FIG. 10. FIG. 13 is a sectional elevational view taken approximately along line 13-13 shown in FIG. 10. In particular, FIG. 13 shows details of an example quadric surface in the effluent processing apparatus 1000.

Referring to FIGS. 10, 11, and 12, the effluent processing apparatus 1000 includes an inlet port portion 1002, an outlet port portion 1004, a quadric surface portion 1006 having a quadric surface 1007, and a separating sump portion 1008, as will be described hereinbelow.

Also as shown in FIG. 13, a stand pipe 1030 has one end disposed in the effluent flow chamber 1018 and an opposite end connected to the outlet port 1004. The stand pipe 1030 has a longitudinal central axis 1032 that is concentric to the center axis 1022 of the quadric surface 1007.

A separating sump 1008 contains filtration media, designated as small circles "1020" in the separating sump 608. The separating sump 1008 containing filtration media 1020 is disposed along one side of the quadric surface 1007. The separating sump 1008 has a wall 1060 (FIG. 12) with exit slots 1062. A baffle 1070 protects the exit slots 1062 in the wall 1060 of the separating sump 1008.

The separating sump 1008 containing the filtration media 1020 is provided for receiving and holding extracted contaminants until the extracted contaminants can be removed from the separating sump 1008. In some embodiments, the filtration media 1020 includes a sponge material. In some embodiments, the filtration media 1020 includes a generic hydrophobic material. In some embodiments, the separating sump 1008 containing filtration media 1020 is detachable as a cartridge to allow the separating sump 1008 to be removed as a unit and replaced with another separating sump.

A transition area 1050 includes a number of slits 1052 that are formed in a wall 1053 of the quadric surface 1007. The slits 1052 are small enough to prevent flow disruption of effluent while still allowing extracted contaminants to drain. The slits 1052 are about 0.8 inches (2.0 centimeters) wide, and function as drain passages for extracted contaminants.

During operation of the effluent processing apparatus 1000, effluent (i.e., air containing oil and water in the form of liquid and aerosol) from the purge valve 126 of the air dryer 108 (FIG. 1) is forced through the inlet port 1002. The effluent stream impacts against the transition area 1050. The effluent stream impacting against the transition area 1050 causes the heavier aerosols and liquid droplets to adhere to the quadric surface 1007 and separate apart from the effluent stream.

The liquids run along the wall 1053 of the quadric surface 1007 and drain through the slits 1052 in the wall 1053 into the volume of the separating sump 1008. The filtration media 1020 holds the contaminants (i.e., the oil and the water) until the filtration media 1020 or the separating sump 1008, or both, are replaced. The vortex inducer projection 1054 provides a surface against which the effluent stream that has been processed through the effluent flow chamber 1018 (i.e., the effluent with contaminants removed) can be deflected sideways into the stand pipe 1030. The cleaned air (i.e., the effluent with contaminants removed) then flows sideways through the stand pipe 1030 and out through the outlet port 1004 to atmosphere.

Although the above-description describes the effluent processing apparatus 200, 600, 1000 being used in a heavy vehicle such as a truck, it is conceivable that the effluent processing apparatus 200, 600, 1000 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An effluent processing apparatus for a vehicle air brake charging system, the effluent processing apparatus comprising:
    an inlet port through which effluent from a purge valve of an air dryer can be received;
    an outlet port;
    a quadric surface defining an effluent flow chamber that is connected in fluid communication between the inlet port and the outlet port and for extracting contaminants from an effluent stream as the effluent stream flows from the inlet port along the quadric surface to the outlet port; wherein a select one or more of a fine mesh, sponge, and coalescing media is coated or adhered on the quadric surface for increasing contaminant extraction efficiency of the quadric surface; and
    a separating sump including filtration media, a bottom panel having drain openings and a snap-on baffle system for protecting the drain openings, wherein the filtration media is disposed at a bottom end of the quadric surface for receiving and holding extracted contaminants until the extracted contaminants can be removed from the separating sump.

2. An effluent processing apparatus according to claim 1, wherein the quadric surface includes a surface curvature of at least a portion of a select one of an inverted paraboloid, a hyperboloid of one sheet, a hyperboloid of two sheets, a cone, an elliptic paraboloid, a truncated cone, a paraboloid, and a circular cylinder.

3. An effluent processing apparatus according to claim 1, wherein the separating sump containing filtration media is detachable as a cartridge to allow the separating sump to be removed as a unit and replaced with another separating sump.

4. An effluent processing apparatus according to claim 1, further comprising:
    a stand pipe having one end disposed in the effluent flow chamber and an opposite end connected to the outlet port, wherein the stand pipe has a longitudinal central axis that is concentric to a center axis of the quadric surface.

5. An effluent processing apparatus according to claim 4, further comprising:
    a vortex inducer projection disposed in the vicinity of the one end of the stand pipe disposed in the effluent flow chamber and centered along the longitudinal central axis of the stand pipe and the center axis of the quadric surface.

6. An effluent processing apparatus according to claim 1, wherein the entire effluent processing apparatus comprises plastic material.

7. An effluent processing apparatus for a vehicle air brake charging system, the effluent processing apparatus comprising:
    an inlet opening through which effluent from a purge valve of an air dryer can be received;
    an outlet opening that is smaller than the inlet opening;
    a surface defining an effluent flow chamber that extends between the inlet opening and the outlet opening and for extracting contaminants from an effluent stream as the effluent stream flows from the inlet opening along the surface to the outlet opening; wherein a select one or more of a fine mesh, sponge, and coalescing media is coated or adhered on the surface for increasing contaminant extraction efficiency of the surface; and
    a separating sump disposed in the vicinity of the outlet opening and including filtration media, a bottom panel having drain openings and a snap-on baffle system for protecting the drain openings, wherein the separating sump receives and holds extracted contaminants until the extracted contaminants can be removed from the separating sump, wherein the separating sump is detachable as a cartridge to allow the separating sump to be removed as a unit and replaced with another separating sump.

8. An effluent processing apparatus according to claim 7, wherein the surface includes a surface curvature of at least a portion of a select one of an inverted paraboloid, a hyperboloid of one sheet, a hyperboloid of two sheets, a cone, an elliptic paraboloid, a truncated cone, and a paraboloid.

9. An effluent processing apparatus according to claim 7, wherein the entire effluent processing apparatus comprises plastic material.

\* \* \* \* \*